United States Patent
Riordan et al.

(10) Patent No.: US 9,762,534 B2
(45) Date of Patent: *Sep. 12, 2017

(54) SYSTEM AND METHOD FOR GEOGRAPHIC SIP SCALING

(71) Applicant: Junction Networks, Inc., New York, NY (US)

(72) Inventors: John Riordan, Brooklyn, NY (US); Eric Tamme, New Rochelle, NY (US)

(73) Assignee: Junction Networks, Inc., Montvale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/176,473

(22) Filed: Feb. 10, 2014

(65) Prior Publication Data

US 2014/0156858 A1  Jun. 5, 2014

Related U.S. Application Data

(63) Continuation of application No. 13/612,144, filed on Sep. 12, 2012, now Pat. No. 8,650,243, which is a continuation of application No. 13/326,864, filed on Dec. 15, 2011.

(60) Provisional application No. 61/438,968, filed on Feb. 2, 2011.

(51) Int. Cl.
*G06F 15/16* (2006.01)
*H04L 29/12* (2006.01)
*H04L 29/06* (2006.01)

(52) U.S. Cl.
CPC ...... *H04L 61/2564* (2013.01); *H04L 61/2589* (2013.01); *H04L 65/105* (2013.01); *H04L 65/1006* (2013.01); *H04L 65/1073* (2013.01); *H04L 65/80* (2013.01); *H04L 61/1511* (2013.01); *H04L 61/1529* (2013.01); *H04L 61/3085* (2013.01); *H04L 61/609* (2013.01)

(58) Field of Classification Search
CPC .. H04L 69/40; H04L 61/2564; H04L 61/2589
USPC .................................................. 709/227, 228
See application file for complete search history.

(56) References Cited

U.S. PATENT DOCUMENTS

| | | | |
|---|---|---|---|
| 6,937,699 B1 * | 8/2005 | Schuster et al. | 379/67.1 |
| 7,626,950 B2 | 12/2009 | Wright et al. | |
| 7,835,352 B2 * | 11/2010 | Zhu et al. | 370/389 |
| 2006/0018272 A1 | 1/2006 | Mutikainen et al. | |
| 2007/0043829 A1 | 2/2007 | Dua | |

(Continued)

FOREIGN PATENT DOCUMENTS

| | | |
|---|---|---|
| RU | 2280275 C2 | 7/2006 |
| WO | 2008066867 A2 | 6/2008 |

OTHER PUBLICATIONS

Non-Final Office Action issued on Jun. 24, 2014 in co-pending U.S. Appl. No. 13/326,864.

(Continued)

*Primary Examiner* — Adnan Mirza
(74) *Attorney, Agent, or Firm* — Nelson Mullins Riley & Scarborough, LLP (57) ABSTRACT

Described herein are aspects relating to a system and method for scaling a session initiation protocol communication system that allows components of the system to be distributed and/or scaled across multiple and different hardware, networks, systems, and locations.

15 Claims, 6 Drawing Sheets

(56) References Cited

U.S. PATENT DOCUMENTS

2008/0247381 A1 10/2008 Bohm et al.
2008/0282254 A1 11/2008 Blander et al.

OTHER PUBLICATIONS

International Search Report and Written Opinion of PCT/US2012/023623 mailed Apr. 19, 2012.
International Preliminary Report on Patentability (Chapter I of the PCT), issued by the International Bureau in PCT Application No. PCT/US2012/023623, mailed Aug. 15, 2013.
Final Rejection issued Apr. 8, 2015 in copending U.S. Appl. No. 13/326,864.

\* cited by examiner

SYSTEM AND METHOD FOR GEOGRAPHIC SIP SCALING

CROSS REFERENCE TO RELATED APPLICATIONS

This application is a continuation of copending U.S. patent application Ser. No. 13/612,144, entitled "System and Method for Geographic SIP Scaling" filed Sep. 12, 2012, in the name of Riordan, et al., which is a continuation of copending U.S. patent application Ser. No. 13/326,864, entitled "System and Method for Geographic SIP Scaling" filed Dec. 15, 2011, in the name of Riordan, et al., which claims the benefit of U.S. patent application Ser. No. 61/438,968, entitled "System and Method for Geographic SIP Scaling" filed on Feb. 2, 2011, in the name of Riordan, et al., the entire disclosures of which are hereby incorporated by reference in their entirety as if set forth verbatim herein and relied upon for all purposes.

FIELD OF THE INVENTION

The present invention relates to session initiation protocol ("SIP") technology, and, more particularly, to geographic distribution and scaling of SIP technology.

BACKGROUND OF THE INVENTION

SIP has become a widely-used signaling protocol for creating and managing multimedia communication services over a network, such as the Internet. Systems and methods for handling SIP communications typically employ components that identify SIP user agents and then route communications to the correct user agents. These components may include an outbound proxy, an inbound proxy, a registrar, and a user location service.

A SIP system may be accomplished by a single device that includes all of the components of the system, including the outbound proxy, the inbound proxy, the registrar, and the user location service. In such a scenario, however, the SIP proxy has a finite capacity, is physically limited to deployment in a single location, and is not cost effective. Alternatively, the SIP components may be scaled across various hardware components in order to distribute processing load of the services. Scaling in this manner, however, is still limited due to the relatively small number of SIP components that may be scaled or separated. Additionally, distributing the actual components across different systems or physical locations causes one or more of the components to become inoperable or unusable.

The present invention recognizes and addresses the foregoing considerations, and others, of prior art construction and methods.

The accompanying drawings, which are incorporated in and constitute a part of this specification, illustrate one or more embodiments of the present invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
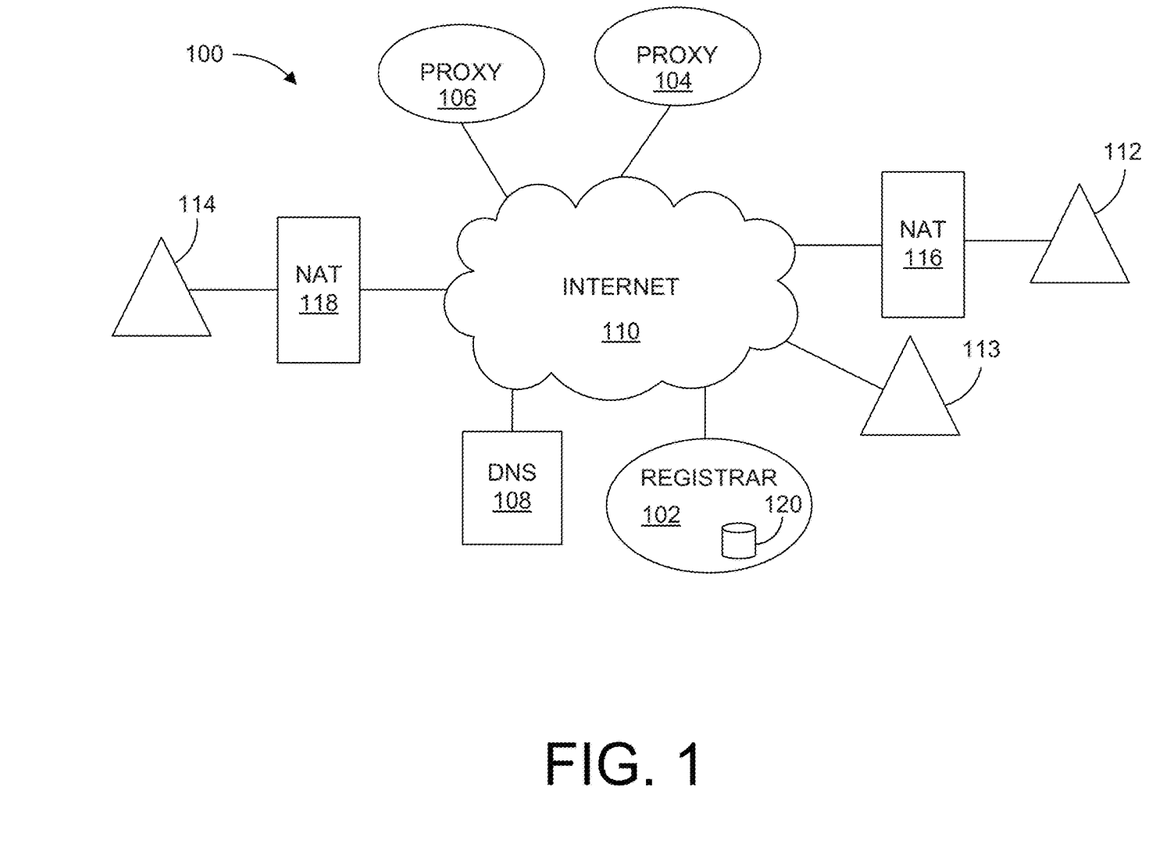
FIGS. 1, 2, and 3 are schematic representations of systems configured to handle SIP sessions and communications in accordance with various embodiments of the present invention.

FIG. 1 is a schematic representation of a system 100 configured to provide a SIP multimedia communications service. System 100 comprises a registrar 102, proxy servers 104 and 106, and a domain name system ("DNS") 108, all of which are interconnected via a wide area network, such as the Internet 110. System 100 comprises at least two SIP endpoints, devices, or user agents, examples of which are denoted at 112, 113, and 114. Such endpoints, devices, and user agents are referred to herein as "UAs" for simplicity. UAs 112 and 114 are operatively connected to Internet 110 indirectly via network address translation devices ("NATs") 116 and 118, respectively, while UA 113 is operatively connected to Internet 110 directly. As should be understood by those skilled in the art, UAs 112, 113, and 114 may be any SIP UA, endpoint, or device, such as those defined in SIP standard RFC 3261 issued by the Internet Engineering Task Force ("IETF") standards organization, which is hereby incorporated by reference as if set forth verbatim herein. It should also be understood that NATs 116 and 118 may be any devices capable of performing network address translation, such as a firewall, router, or other device that handles incoming and outgoing transmissions between networks. In the presently-described embodiment, registrar 102 comprises a database 120 for storing location or contact information associated with UAs 112, 113, and 114, as explained in more detail below.

In the presently-described embodiment, SIP communications exhibit a SIP uniform resource identifier ("URI"), or "SIP URI," that identifies each participant of a SIP session. In one embodiment, the SIP URI comprises a username and a domain in the form of user@domain. As with most internet protocol ("IP") transmissions, SIP communications are associated with a transmission control protocol ("TCP") or user datagram protocol ("UDP") port. In this embodiment, SIP communications handled by system 100 use TCP or UDP ports 5060 and 5061. The port may be included in the SIP URI for the respective UA, such as in the form of user@domain:port. It should be understood by those skilled in the art that the SIP address may be preceded by the identifier "SIP" to indicate that the communication is a SIP communication. For instance, the SIP URI may take the form SIP:user@domain or SIP:user@domain:port. Each UA's address or SIP URI may also be referred to as the UA's Address of Record ("AOR").

In the current embodiment, system 100 uses the form of the SIP URI that includes a domain, which must be a globally-routable domain on Internet 110. For purposes of the ensuing explanation, for instance, UA 112 is associated with the SIP URI userX@domain.com, while UA 114 is associated with the SIP URI userY@domain.com. It should also be understood that a SIP URI may be associated with multiple UAs and that every UA is associated with at least one SIP URI. In the presently-described embodiment, for example, UA 113, like UA 114, is associated with the SIP URI userY@domain.com. Thus, it should be understood that UA 113 may be associated with additional SIP URIs, depending on the capabilities of the UA, and that each SIP URI, such as userX@domain.com and userY@domain.com, may be associated with additional UAs.

Figure 4:
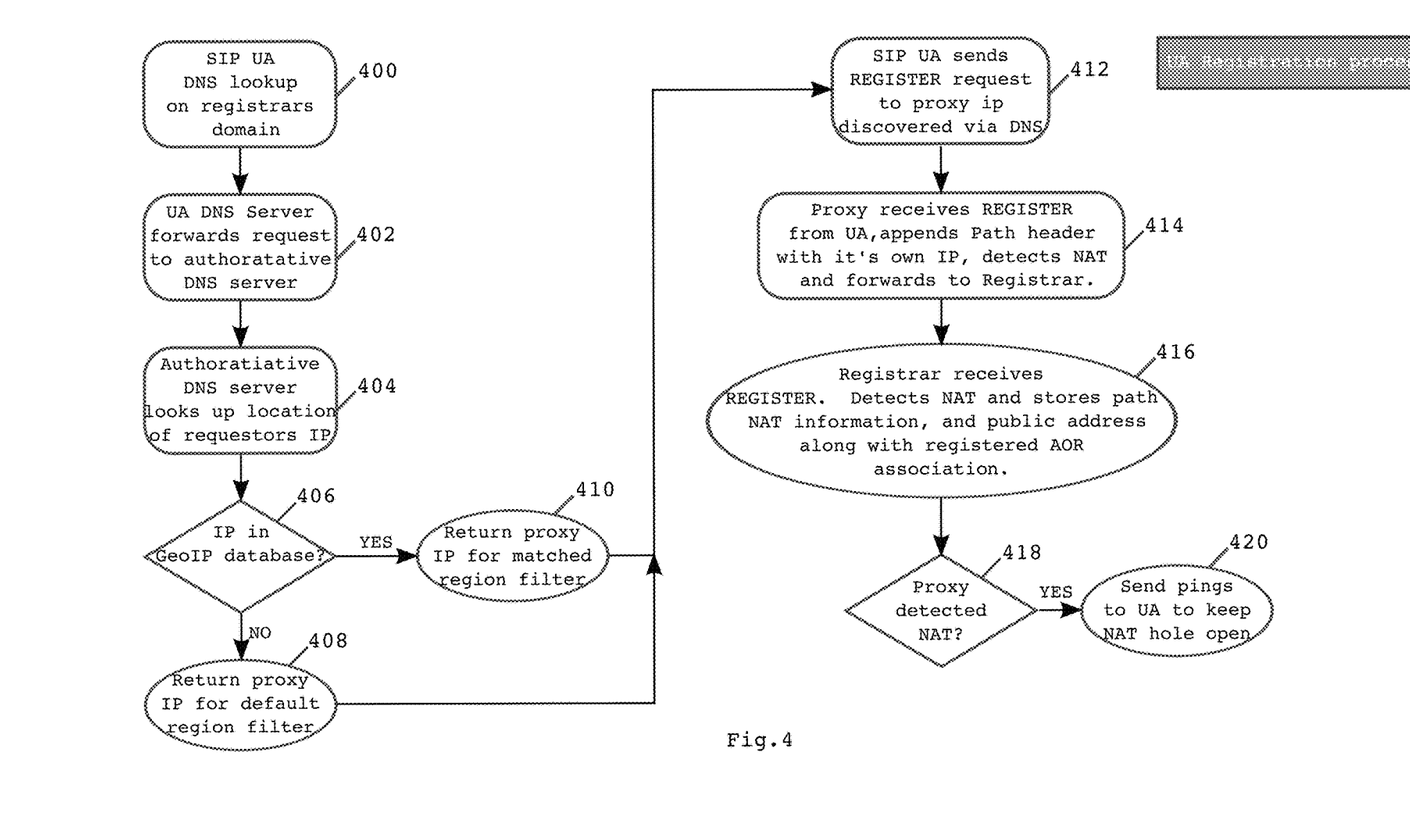
FIG. 4 is a flowchart illustrating an exemplary method for registering a user agent in accordance with an embodiment of the present invention.

FIG. 4 illustrates an exemplary process for registering a UA in accordance with an embodiment of the present invention. Referring to FIGS. 1 and 4, when a UA is initialized or activated, it attempts to register information regarding its location in order to engage in SIP communications. For example, UAs 112, 113, and 114 transmit data comprising the SIP URI(s) associated with the respective UA to a server of system 100 configured to handle or manage SIP communications for the SIP URI's domain. In this example, UAs 112, 113, and 114 perform a DNS lookup for such a SIP server for domain.com at step 400 when the UAs are initialized. In the presently-described embodiment, UAs 112, 113, and 114 are all associated with SIP URIs for the same domain and therefore seek a server tasked with handling SIP sessions for that domain. It should be understood, however, that the UAs may be associated with different and/or multiple domains. Those skilled in the art should thus appreciate that although the ensuing explanation applies to scenarios involving one domain, it is nonetheless applicable to scenarios involving different and/or multiple domains.

In a manner that should also be understood by those skilled in the art, DNS 108 eventually directs the DNS lookup requests to the DNS server tasked with resolving the requested domain to an IP address, at step 402. In the presently-described embodiment, this is accomplished by DNS 108 for domain.com, although it should be understood that DNS 108 may be defined to include multiple servers located in different physical locations that are unrelated to one another and that handle DNS services for unrelated top level domains.

In the presently-described embodiment, DNS 108 analyzes the IP address attached to the DNS lookup request or that made the request, at step 404. In this example, the IP address for the DNS lookup request from each UA is the IP address of the device that requests the DNS information, which may be the IP address for the UA, a NAT to which the UA is operatively connected, or any other device to which the UA is operatively connected that is tasked with processing DNS requests for the respective network that includes the UA. In this example, the IP addresses for the DNS requests are the IP address for NAT 116 (for the request from UA 112), the IP address for NAT 118 (for the request from UA 114), and the IP address of UA 113 (for the request from UA 113). At step 406, DNS 108 applies one or more filters and/or rules to the IP address of the requestor before it resolves the relevant domain name to an IP address associated with a server that handles SIP communications for the domain. In a preferred embodiment, the filters and rules perform a GeoDNS function so that the relative geographic location of the requestor is identified based on the IP address associated with the respective DNS request. Those skilled in the art should appreciate that the GeoDNS function may be performed by any suitable IP geolocation software applications or services, such as those provided by IP2Location of Penang, Malaysia and MaxMind of Boston, Mass. If the filters and/or rules applied at step 406 to the IP address associated with the DNS request return a specific proxy server tasked with handling SIP communications for the domain, DNS 108 resolves the domain name of the request to the IP address associated with that proxy server, at step 410. Otherwise, DNS 108 resolves the domain name of the request to the IP address of a proxy server by applying a default region filter or rule at step 408. That is, if there is no result of the process performed at step 406 or if the result is not a specific proxy server, DNS 108 applies a default filter or rule to the DNS request that returns a default proxy server for the domain associated with the request.

In this embodiment, for example, proxy servers 104 and 106 are servers of system 100 tasked with handling SIP communications for the domain. Proxy server 104 is located in New York, while proxy server 106 is located in a geographic location remote from New York, such as California. UAs 112 and 113 (and NAT 116) are physically located in New York, while UA 114 (and NAT 118) is physically located in California. When UAs 112 and 113 request the IP address associated with a SIP server for the domain, DNS 108 returns the IP address of proxy server 104, while the IP address of proxy server 106 is provided to UA 114 in response to its request for the IP address associated with a SIP server for the domain. It should be understood that this allows the UAs of system 100 to communicate with the SIP server for the domain closest to the respective UA. Those skilled in the art should appreciate that UAs 112 and 113 communicate with a separate, distributed SIP/proxy server located in a different physical location compared to the SIP/proxy server with which UA 114 communicates even though each of the UAs requested the IP address of a SIP server for the same domain. Those skilled in the art should also appreciate that this allows UAs to communicate with different proxy servers for the same domain based on their physical location even though they may be associated with the same SIP URI. For example, UAs 113 and 114 are both associated with the SIP URI userY@domain.com but communicate with different proxy servers 104 and 106, respectively, because UA 113 is located in New York, while UA 114 is located in California.

It should be understood that filters and rules other than those related to GeoDNS may be applied by DNS 108 in order to identify the proxy server with which a UA should communicate without departing from the scope of the present invention. For instance, it should be understood that other network addressing and routing methodologies, such as anycast, may be utilized depending on the requirements and goals of the corresponding SIP system.

Once the requested information is resolved to the IP address of the proxy server to which the UAs should direct their communications, the user agents contact the respective proxy server to register their location at step 412. For example, UAs 112 and 113 transmit data to proxy server 104 representative of their respective locations, while UA 114 transmits data to proxy server 106 representative of its location. The data transmitted by the UAs may include the IP address and port number that the respective UA is using to make SIP transmissions. NAT 116 handles routing the data from UA 112 to proxy server 104, while NAT 118 handles routing the data from UA 114 to proxy server 106. UA 113 transmits the data directly to proxy server 104.

When the respective proxy server receives the registration request at step 414, it identifies the actual, public IP address of the transmitting device, which is typically the IP address of the respective NAT, such as for UA 112 and 114, and the public IP address for UA 113. When the data is routed to the proxy server via a NAT, the receiving proxy server retrieves the IP address and port number for the user agent located behind the NAT contained in the transmitted data. In preparation for transmitting the data to registrar 102 via Internet 110, as explained below, the proxy server creates a path header comprising the proxy server's direct contact address. Preferably, the path header complies with SIP extension path header standard RFC 3327 issued by the IETF, which is hereby incorporated by reference as if set forth verbatim herein.

In the current embodiment, the path header also includes an indication of whether the relevant UA is located behind a NAT device. Continuing the example set forth above, for instance, proxy server 104 retrieves the data transmitted from UA 112 via NAT 116, analyzes the data as set forth above, prepares and attaches a path header to the data, and transmits it to registrar 102, also at step 414. Likewise, proxy server 106 retrieves the data transmitted from SIP endpoint 114 via NAT 118, analyzes the data, prepares and attaches a path header to the data, and transmits the data to registrar 102 at step 414. As described in more detail below, registrar 102 receives and stores the registration information from proxies 104 and 106 for UA 112 and 144, respectively, in database 120 at step 416.

The proxy servers also operate to maintain or keep open a NAT hole or tunnel in the corresponding NAT so that the NAT does not prevent return traffic to the respective UA. At step 418, for instance, proxy server 104 uses the data received via NAT 116 to identify the NAT's IP address and port it used to transmit the registration information. At step 420, proxy server 104 transmits "keep alive" data packets to NAT 116 in order to keep the NAT hole or tunnel open so that the NAT will route incoming communications to UA 112 rather than blocking or preventing them.

When a proxy server receives location information from a UA that is not located behind a NAT, the proxy server adds the IP address and/or port information for the UA to the path header, along with an indication that the UA is not behind a NAT. For instance, proxy server 104 receives location information from UA 113, creates the path header therefrom, and forwards the data to registrar 102.

Upon receipt of the data from the proxy server, registrar 102 stores the information contained therein in database 120 at step 416, as explained above. The data stored in the database includes the SIP URI, the IP and port provided by the UA, an indication whether the UA is behind a NAT, the public IP address related to the UA, and information corresponding to the proxy server that is now associated with the particular UA. For instance, the data received by registrar 102 from proxy server 104 for UA 112 includes "userX@domain.com," the internal IP address and port number used by UA 112 for SIP communications, an indication that the UA is behind NAT 116, the UA's public IP address, which, in this case, is the NAT's IP address, and information corresponding to proxy server 104, such as its IP address, all of which is contained in the path header. Thus, it should be understood that database 120 of registrar 102 contains data that identifies the location of a UA, the proxy server that handles SIP communications for that particular UA, and the SIP URI(s) associated with the UA for each UA registered with the system. For example, database 120 stores the appropriate information for each UA 112, 113, and 114.

Figure 5:
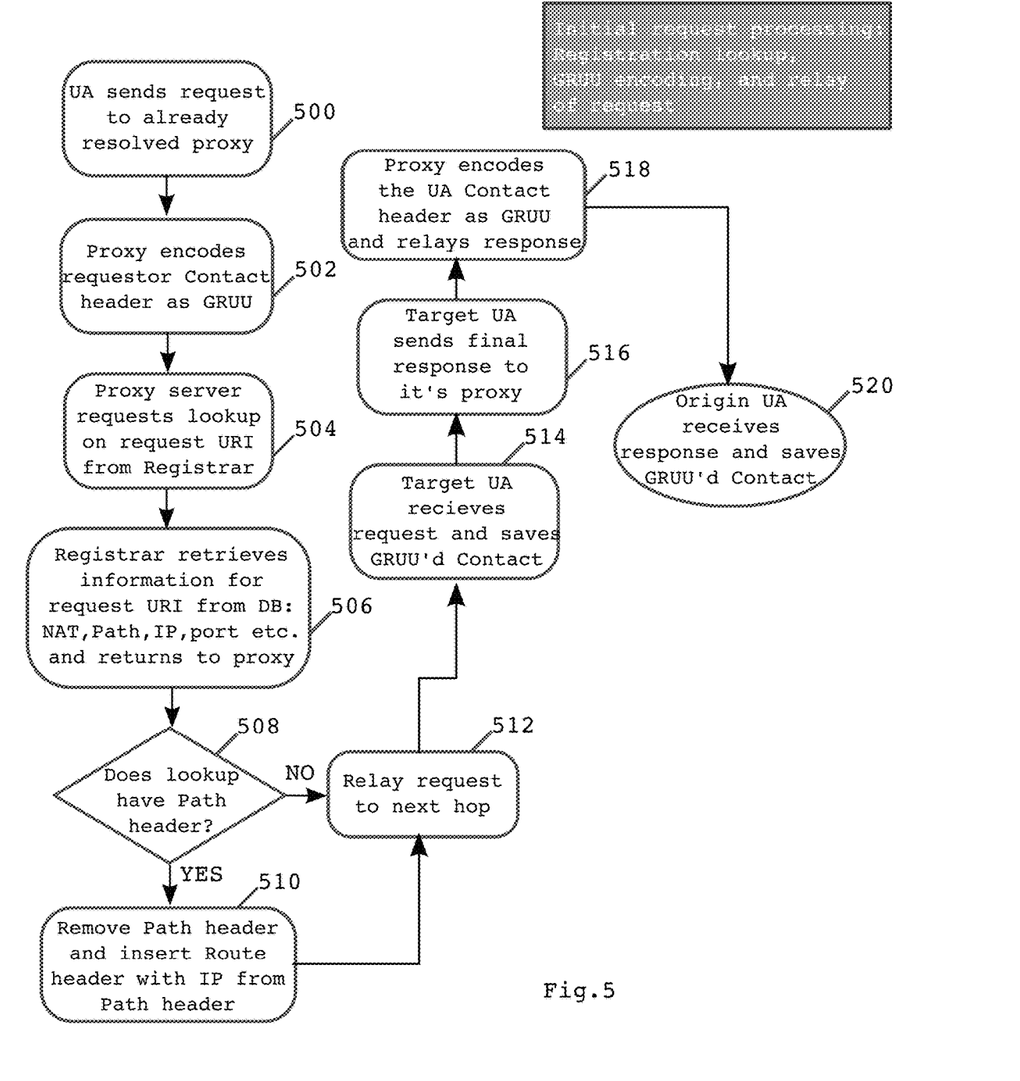
FIG. 5 is a flowchart illustrating an exemplary method for processing a SIP request in accordance with an embodiment of the present invention.

FIG. 5 illustrates an exemplary method for processing a SIP request, which is described with reference to FIG. 1. As explained above, the IP address of the server tasked with handling SIP communications for the domain has already been resolved to proxy server 104 for UA 112. In order for the user associated with the SIP URI userX@domain.com to engage in a SIP session with the user associated with the SIP URI userY@domain.com, UA 112 transmits a SIP request to proxy server 104 at step 500. As explained in more detail below, proxy server 104 encodes the contact header from the information received by the proxy server from UA 112 as a globally routable UA URI ("GRUU") at step 502. The request from UA 112 includes the SIP URI of the user to which the SIP communication is directed, which, in this example, is userY@domain.com. At step 504, proxy server 104 requests the information from registrar 102 corresponding to the SIP URI. At step 506, registrar 102 searches and retrieves the information from database 120 for the requested SIP URI. In this example, the data retrieved from the database includes the location information for UAs 113 and 114 because both UAs are associated with the particular SIP URI in the database.

Also at step 506, registrar 102 transmits the data back to proxy server 104, which includes the location information for UAs 113 and 114. For purposes of the ensuing explanation, the information returned by registrar for each UA is referred to as the "lookup" for that UA. It should be understood that the lookup for UA 113 includes an identification of proxy server 104 as the proxy server tasked with handling SIP communications on behalf of UA 113, while the lookup for UA 114 includes an identification of proxy server 106 as the proxy server tasked with handling SIP communications on behalf of UA 114. Since the lookup information for UA 113 identifies the same proxy server that requested the information—proxy server 104—then, in one embodiment, registrar 102 removes the path header from the lookup information for UA 113.

For each UA identified by registrar 102 at step 506, proxy server 104 determines whether the lookup for the UA includes a path header, at step 508. The path header for a UA is described above with respect to FIG. 4. If so, proxy server 104 identifies the IP address in the path header, removes the path header, and adds a route header that includes the identified IP address, at step 510. It should be understood that the IP address identified from the path header is the IP address of the proxy server associated with the UA when that proxy server registered the contact information for the UA, as explained above with regard to FIG. 4. In the present example, the IP address in the path header for UA 114 is the IP address associated with proxy server 106.

If the lookup does not include a path header for a UA, the proxy server adds a route header that includes the IP address associated with the respective UA that is identified by registrar 102 at step 506. As explained above, for instance, registrar 102 previously removed the path header from the lookup for UA 113 at step 506. In this example, the IP address of the route header is the IP address associated with UA 113, but those skilled in the art should appreciate that is may instead be the IP address of a NAT if one should be located between UA 113 and Internet 110.

At step 512, proxy server 104 transmits the SIP request to the IP address identified in the route header for each UA via a branching process that should be understood by those skilled in the art. In the present example, for instance, proxy server 104 transmits the request to UA 113 and to proxy server 106 for UA 114. Proxy server 104 transmits a request for each UA identified by registrar 102 associated with the target SIP URI.

During registration of UA 114, proxy server 106 received data from NAT 118 that allowed the proxy server to keep a NAT hole or tunnel open to allow incoming communications directed to the UA. Upon receipt of the SIP request, proxy server 106 transmits the request to UA 114 via NAT 118 by using the same information it used to keep the NAT tunnel open. Concurrently, proxy server 104 transmits the SIP request directly to UA 113 in this example.

At step 514, any UA associated with the target SIP URI that receives the request saves the GRUU information of the requesting UA. At step 516, the receiving UA transmits a final response to the proxy server with which the receiving UA is associated. If UA 113 responds to the SIP request, for instance, it transmits data representative of the response back to proxy server 104. Alternatively, if UA 114 responds to the SIP request, it transmits data representative of the response back to proxy server 106 via NAT 118. Proxy server 106 transmits the response from UA 114 back to proxy server 104. At step 518, the proxy server of the UA sending the response encodes the UA's contact information as a GRUU and relays the response back to the originating UA. In an example where proxy server 106 transmits the response back to UA 112 via proxy server 104 on behalf of UA 114, proxy server 106 encodes the contact information for UA 114 as a GRUU and transmits it to UA 112. At step 520, the originating UA, UA 112 in this example, receives the response and saves the GRUU'd contact information.

In the scenario where the SIP request was transmitted to multiple UAs, the proxy server for the requesting UA (proxy server 104 in this example) transmits data cancelling the request to the other UA(s) when a response back from any of the UAs to which the request was transmitted traverses the proxy server. When UA 112 receives a response to the SIP request from either UA 113 or 114, UA 112 and the responding UA establish a SIP session. The UAs then engage in a dialog in a manner that should be understood by those skilled in the art. Any conventional in-dialog requests that occur during the SIP session are handled in a conventional manner understood by those skilled in the art.

Those skilled in the art should appreciate that the method and system described above is configured to handle and manage conventional in-dialog requests. In order to handle out-of-dialog requests, the method and system rewrite the contact header of the SIP communication to comprise a GRUU. Preferably, the GRUU of the contact header complies with the GRUU RFC 5627 standard as established by IETF, which is hereby incorporated by reference as if set forth verbatim herein. In such an embodiment, the proxy server tasked with handling SIP communications on behalf of a first UA encodes the location information associated with the first UA and rewrites the contact header of each data packet transmitted by the first UA as a GRUU to include the encoded information. The information comprises the location information for the first UA, such as its IP address, port number, and whether it's located behind a NAT, as well as the contact information for the proxy server, such as its IP address.

Although the information is encoded into each transmission by the UA, the proxy server tasked with handling SIP communications for a second UA that receives the initial SIP request decodes the information contained in the GRUU included in the contact header of the initial SIP request. The proxy server then rewrites the contact header of the SIP request in such a manner that, when the second UA receives and stores it, the stored information is sufficient to allow the second UA to locate and communicate with the first UA outside of the SIP session if necessary. That is, the second UA stores a copy of all the information necessary to locate and communicate with the first UA. If desired, this allows the second UA to establish another SIP session with the first UA based on the stored information. It also allows the second UA to handle out-of-dialog requests. For instance, should the second UA wish to "transfer" the first UA to another SIP session in which the second UA is involved, it possesses all the necessary information to do so. That is, because the second UA has access to information sufficient to locate and communicate with the first UA, it can transmit this information to a third UA as needed. The third UA can make use of the location information for the first UA in order to establish a SIP session therewith. The SIP session then continues in a manner as understood by those skilled in the art.

Figure 6:
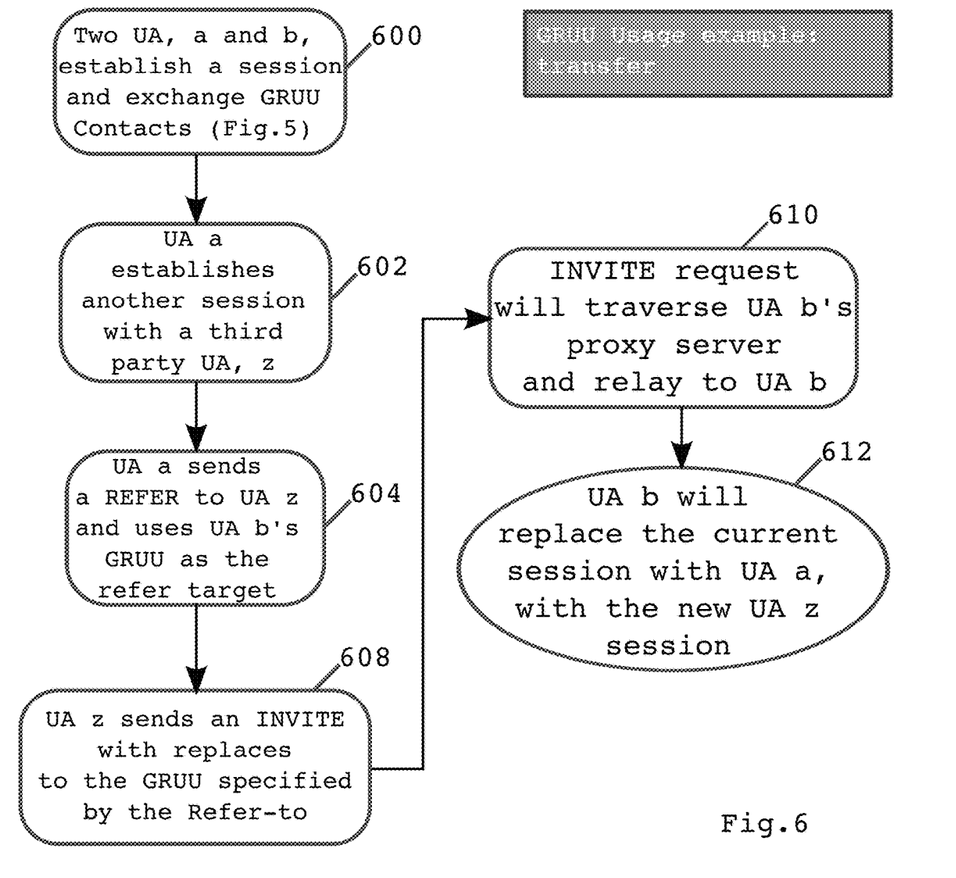
FIG. 6 is a flowchart illustrating an exemplary method for executing a globally routable user agent uniform resource identifier ("URI"), or "GRUU," transfer in accordance with an embodiment of the present invention.

FIG. 6 illustrates an exemplary process of using the GRUU information to handle an out-of-dialogue SIP request. At step 600, two UAs (a) and (b) establish a session and exchange GRUU contact information in the manner described above with respect to FIG. 5. At step 602, UA (a) establishes another SIP session with a third UA (z). At step 604, UA (a) transmits a REFER to UA (z) and uses the GRUU contact information of UA (b) as the REFER target. UA (z) sends an INVITE "with Replaces" to the GRUU specified by the REFER-TO. Procedures associated with out-of-dialogue requests, such as an "Attended Transfer," including "REFER," "REFER-TO," "INVITE," and "INVITE with Replaces," should be understood by those skilled in the art and are therefore not described in further detail. The INVITE from UA (z) traverses the proxy server associated with UA (b) and relays to UA (b) at step 610. UA (b) replaces the current SIP sessions with UA (a) with a new SIP session with UA (z). The SIP session between UA (b) and UA (z) then progresses in a manner understood by those skilled in the art.

It should be understood that the above description provides a method and system for handling SIP sessions whereby functional units of the system that handle the SIP sessions may be distributed and scaled across separate systems and/or different geographical locations. In one embodiment, the SIP requests and communications are routed through a proxy server that is tasked with handling SIP communications for a particular UA. In a preferred embodiment, the proxy server is selected based on its relative geographic proximity to the UA.

Figure 2:
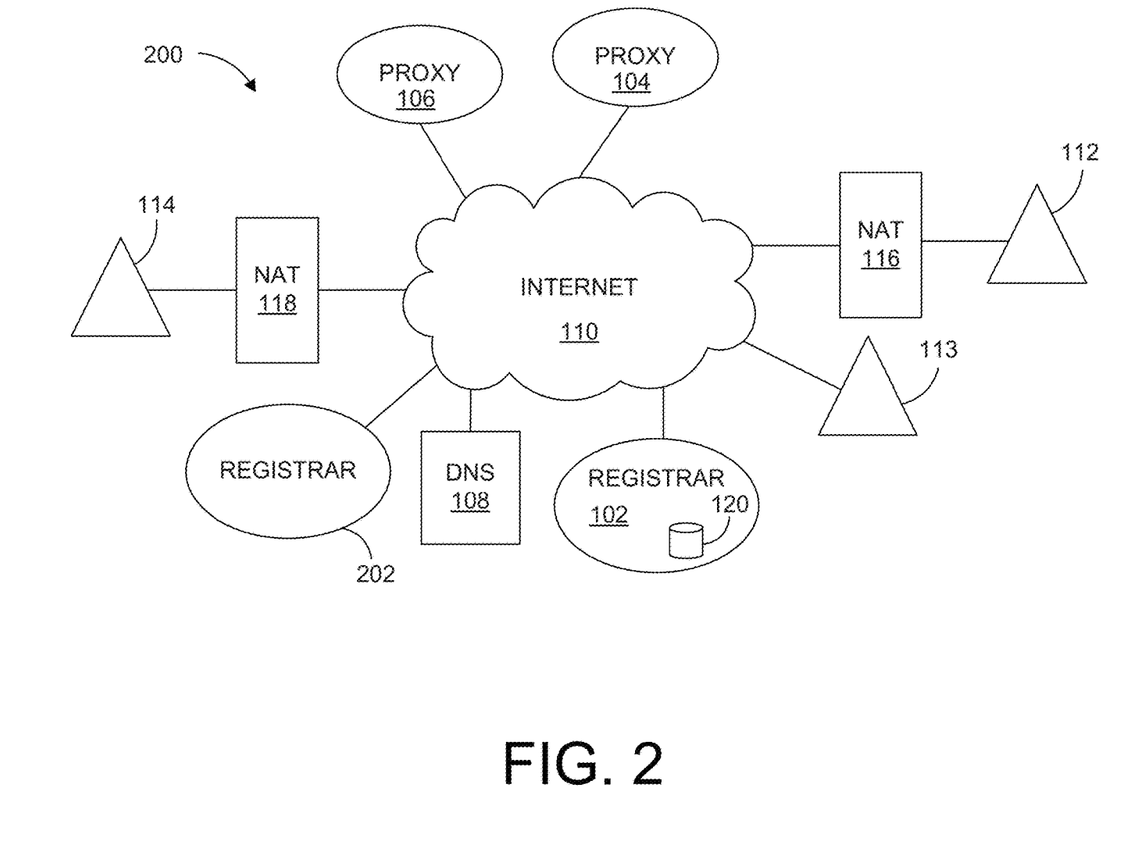

It should be understood, however, that functional units of the system configured to handle SIP sessions other than the proxy server may also be distributed and scaled across separate systems and/or different geographic locations. Referring to FIG. 2, for instance, a SIP system 200 comprises a second registrar 202, as well as the components of system 100 described above with respect to FIG. 1. In this embodiment, registrar 202 performs functions similar to that of registrar 102. In the presently-described embodiment, each proxy server is configured to register and request UA location information from a particular registrar. Preferably, the selected registrar is located relatively close in geographical proximity to the requesting proxy server in order to maximize the speed, quality, and efficiency of the requests and responses. In this example, for instance, proxy server 104 is configured to register and request UA location information by communicating with registrar 102. By comparison, proxy server 106 may be configured to register and request UA location information using registrar 202.

Registrar 202 accesses the same user information location information that registrar 102 accesses from database 120. Those skilled in the art should appreciate that this may be accomplished in several manners without departing from the scope of the present invention. For example, registrar 202 may maintain and/or access its own registration database. In such a scenario, any changes to the database maintained by registrar 202 or to database 120 maintained by registrar 102 would be transmitted to the other registrar in order to replicate the change in the other database. Alternatively, registrar 202 may simply connect to, store user location information in, and retrieve the same from database 120 that is maintained by registrar 102. Regardless, it should be understood that system 200 is configured to utilize multiple registrars that may be distributed and scaled across multiple systems and locations.

Figure 3:
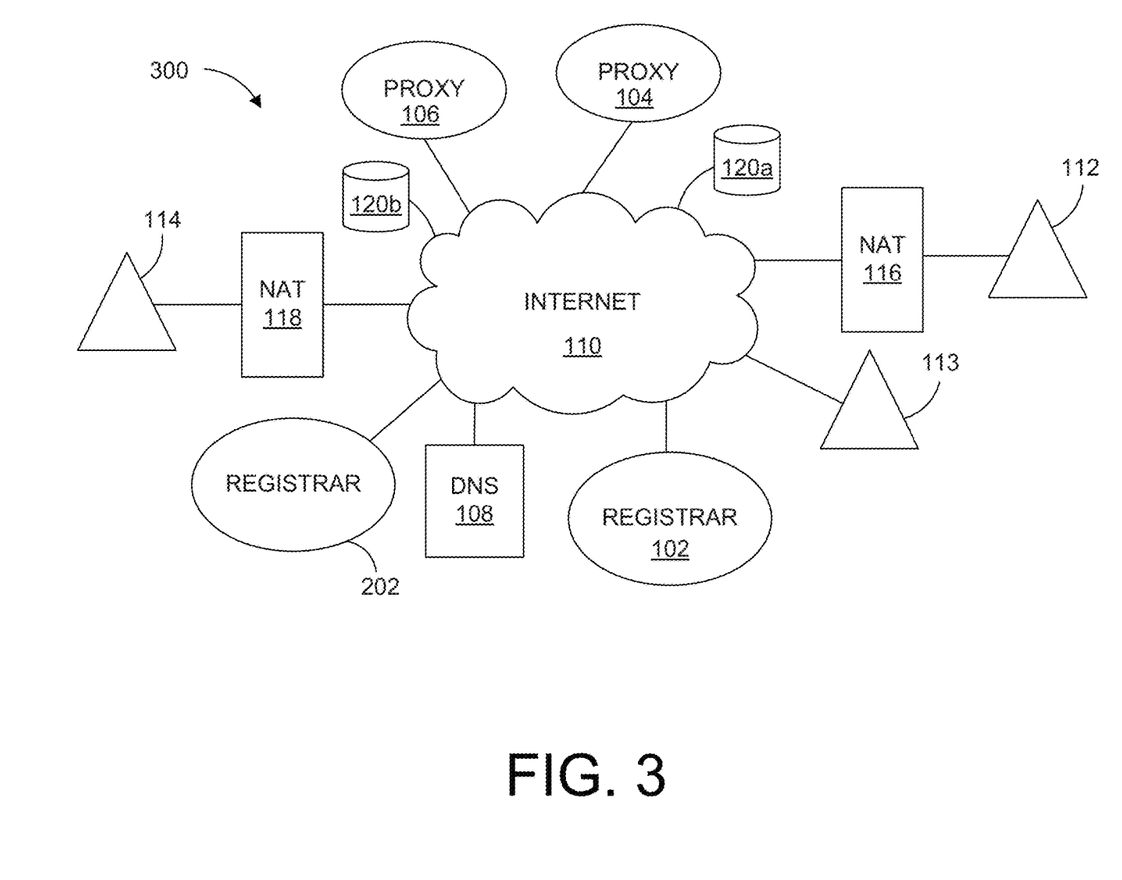

Those skilled in the art should appreciate that the SIP systems described above provide for the ability to distribute and scale each functional unit of the systems. Referring to FIG. 3, for instance, a SIP system 300 comprises the same functional components of system 200 described above with respect to FIG. 2. In this embodiment, however, database 120 has been separated from registrar 102 and is operatively connected to registrars 102 and 202 via Internet 110. In this embodiment, database 120 is independent of any of the registrars, which connect to, store, and retrieve user location information with the database directly.

In the presently-described embodiment, database 120 is also distributed and scaled across multiple database stores (denoted at 120a and 120b). In such an embodiment, a registrar may be associated with and configured to store and retrieve user location information from a particular database store. For instance, registrar 102 may be configured to use database store 120a as its database store for user location information, while registrar 202 may be configured to use database store 120b. Those skilled in the art should appreciate that the data maintained by one instance of database 120 may be replicated to the other instance of database 120 in a number of ways without departing from the scope of the present invention.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those skilled in this art that the present invention is not limited to these embodiments since modifications can be made. Therefore, it is contemplated that any and all such embodiments are included in the present invention as may fall within the scope and spirit thereof.

What is claimed is:

1. A method for processing a session initiation protocol (SIP) request, comprising:
   receiving a SIP request from a user agent (UA) comprising an identifier of a different UA;
   obtaining the lookup information of the different UA based on a request to a registrar comprising the identifier;
   determining whether the lookup information includes a path header for the different UA, the path header comprising an internet protocol (IP) address of a proxy server related to the different UA; and
   generating a routing header for the SIP request based at least in part on whether the lookup information includes said path header for the different UA.

2. The method of claim 1, wherein generating the routing header comprises including information from the path header in the routing header where the lookup information includes the path header.

3. The method of claim 1, wherein generating the routing header comprises including information regarding the different UA in the routing header where the lookup information does not include the path header.

4. The method of claim 3, wherein the information comprises an internet protocol (IP) address of the different UA or a related network address translation (NAT) device received from the registrar in the location information.

5. The method of claim 1, further comprising:
   receiving UA contact information from the UA including at least one of a SIP uniform resource identifier (URI) or an internet protocol (IP) address of the UA; and
   transmitting at least a portion of the UA contact information to the registrar for retrieval by other proxy servers.

6. The method of claim 5, further comprising creating a UA path header that includes the portion of the UA contact information, wherein the transmitting comprises transmitting the UA path header to the registrar.

7. The method of claim 1, further comprising:
   appending the routing header to the SIP request; and
   transmitting the SIP request based at least in part on an internet protocol (IP) address in the routing header.

8. The method of claim 7, wherein obtaining the lookup information comprises obtaining lookup information for a plurality of different UAs related to the identifier, wherein appending comprises appending a plurality of routing headers to a plurality of instances of the SIP request, and wherein transmitting comprises transmitting the plurality of instances of the SIP request to the plurality of different UAs.

9. The method of claim 8, further comprising:
   receiving a response to one of the plurality of instances of the SIP request from one of the plurality of different UAs; and
   cancelling one or more of the plurality of instances of the SIP request related to a remaining portion of the plurality of different UAs.

10. A method for processing a session initiation protocol (SIP) request, comprising:
    receiving a request for lookup information of a first user agent (UA) from a second proxy server related to a second UA;
    determining the lookup information for the first UA based on a path header received from a first proxy server related to the first UA; and
    transmitting at least a portion of the lookup information to the first proxy server based on whether the first proxy server is the second proxy server.

11. The method of claim 10, wherein the transmitting comprises including the path header with the portion of the lookup information where the first proxy server is different from the second proxy server.

12. The method of claim 10, further comprising removing the path header from the portion of the lookup information where the first proxy server is the second proxy server.

13. A system for processing a session initiation protocol (SIP) request, comprising:

a registrar for receiving a request for lookup information of a first user agent (UA) from a second proxy server related to a second UA; and a database for storing the lookup information for the first UA based on a path header received from a first proxy server related to the first UA, wherein the registrar determines the lookup information from the database based at least in part on an identifier of the first UA specified in the request, and transmits at least a portion of the lookup information to the first proxy server based on whether the first proxy server is the second proxy server.

14. The system of claim 13, wherein the registrar includes the path header in transmitting the portion of the lookup information where the first proxy server is different from the second proxy server.

15. The system of claim 13, wherein the registrar removes the path header from the portion of the lookup information where the first proxy server is the second proxy server.

* * * * *